W. H. BRADSHAW.
EYEGLASS HOLDER.
APPLICATION FILED MAR. 10, 1909.
942,480.
Patented Dec. 7, 1909.
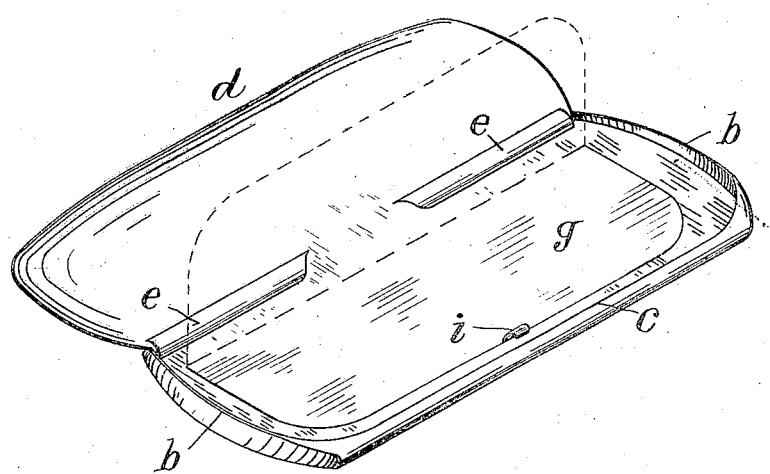
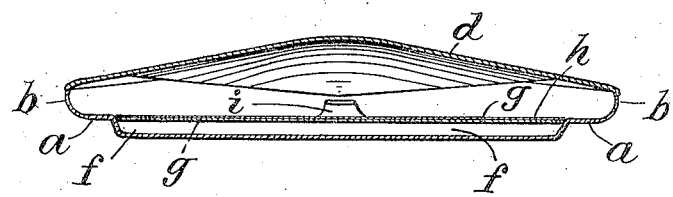
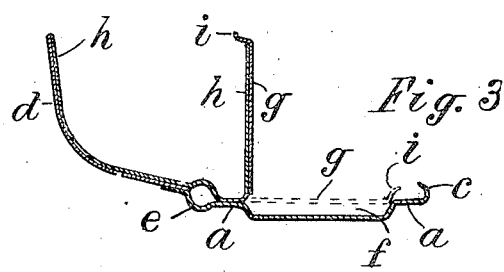
Witnesses:
L. Lee.
J. W. Greenbaum
Inventor.
William H. Bradshaw, per
Thomas S. Crane, Atty.

UNITED STATES PATENT OFFICE.

WILLIAM H. BRADSHAW, OF NYACK, NEW YORK.

EYEGLASS-HOLDER.

942,480.  Specification of Letters Patent.  Patented Dec. 7, 1909.

Application filed March 10, 1909. Serial No. 482,498.

*To all whom it may concern:*

Be it known that I, WILLIAM H. BRADSHAW, a citizen of the United States, residing at Highmount avenue, Nyack, county of Rockland, State of New York, have invented certain new and useful Improvements in Eyeglass-Holders, fully described and represented in the following specification and the accompanying drawings, forming a part of the same.

The present invention relates to such eyeglass-holders as are divided in halves and furnished with a hinge-lid which must be opened to remove the glasses therefrom; and the object of the invention is to furnish such hinged holders with an interior chamber for retaining a polishing cloth or other material therein; the cover of the chamber lying beneath the eyeglasses when in the holder so that the cover requires no fastening, but is held closed by the eyeglass as long as the eyeglass remains in the holder. The eyeglass is, of course, removed from the case whenever it requires cleaning, which permits the cover of the chamber to be opened, giving access to the polisher. Spectacles with skeleton hook-bows are often carried in such an eyeglass case, but the invention relates to the case whether it be used for carrying an eyeglass or spectacles.

The invention will be understood by reference to the annexed drawing, in which—

Figure 1 is a perspective view of an eyeglass-holder provided with my improvement; Fig. 2 is a longitudinal section at the middle of the holder with the lid closed, the rear half of the holder being removed; and Fig. 3 is a transverse section at the middle of the holder with the lid opened and the cover raised from the chamber but shown in dotted lines in its closed position.

$a$ designates the ordinary bottom of the holder, $b$ the end flanges, $c$ the front flange and $d$ the lid with hinge at $e$, and arranged to close upon the flanges $b$ and $c$. Such lids are usually formed with a metallic spring hinge, but concealed by a velvet lining to which the letter $e$ is applied.

The details of construction of the holder are immaterial, as the new feature consists of the chamber or recess $f$ formed within the holder, as shown in Figs. 2 and 3, and provided with a cover $g$ to retain a cleaner in the chamber.

The lid $d$ is shown in Fig. 3 with a flexible lining $h$ and such lining extended over the top of the cover $g$, forming a hinge therefor, as shown in Fig. 3. A tongue or thumbpiece $i$ is shown upon the free edge of the cover, for lifting the same when opening the chamber $f$. The lid requires no fastening, as the eyeglass or spectacles lie upon it when in the holder and keep it closed upon the chamber.

No additional expense is incurred in forming the holder with the depression or recess $f$ to form a chamber, and the cost of the cover $g$ is entirely nominal, and the holder is therefore provided with a chamber and cover at very trifling expense. The user of the glasses is thus enabled to keep a polisher always convenient for use, free from dust or dirt, in the chamber in the holder where the glasses themselves are stored when not in use.

The edges of the recess $f$ are shown sloped inwardly from the bottom $a$, which not only facilitates the stamping of the recess in the metal of the holder, but enables such edges to support the cover $g$ so that it may be fitted therein flush with the bottom of the holder, so as not to protrude within the holder and occupy any of the space intended for the glasses. The lining $h$ which commonly extends over the lid and the bottom of the holder is thus enabled to fit smoothly over the cover $g$ and to form the hinge therefor.

In the class of eyeglass-holders shown in Fig. 2, one side of the holder is commonly made with a flat bottom and flanges at the edges upon which a cover can close, and the cover is sometimes made flat and sometimes arched in the center to clear the nose-piece of the glasses as shown in Fig. 2, but when it is made flat either side may be regarded as the bottom and the opposite side as the cover, and it would obviously be immaterial whether the recess for the polisher be stamped within one or the other, provided it opens upon the interior of the holder so that the lid of the recess requires no fastener but is in contact with the spectacles or eyeglasses when carried in the holder so that it is held closed automatically.

Having thus set forth the nature of the invention what is claimed herein is:

1. An eyeglass holder having two sides with an interior chamber formed in one of the sides to receive a polisher for the glasses, and a cover hinged within such side to confine the polisher in the chamber, the cover being held closed by the glasses when carried in the holder.

2. An eyeglass holder having two sides connected by a hinge, one of such sides having a chamber opening within the holder, a cover fitted to the inside of the holder containing such chamber and the lid of the holder having a lining $h$ extended over such cover and secured to the same to form a hinge for the cover.

3. An eyeglass holder having two sides connected by a hinge, one of such sides having a chamber opening within the holder, a cover hinged to the bottom of the holder inside the same near the hinge of its lid, such cover having the thumb-piece $i$ for lifting the same.

In testimony whereof I have hereunto set my hand in the presence of two subscribing witnesses.

WILLIAM H. BRADSHAW.

Witnesses:
THOMAS S. CRANE,
L. LEE.